(12) United States Patent
DeGroot et al.

(10) Patent No.: US 11,345,551 B2
(45) Date of Patent: May 31, 2022

(54) SEALED SPROCKET FOR A CONVEYOR SYSTEM

(71) Applicant: Laitram, L.L.C., Harahan, LA (US)

(72) Inventors: Michael Hendrik DeGroot, Rockford, MI (US); David A. Kokx, Hart, MI (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 17/319,437

(22) Filed: May 13, 2021

(65) Prior Publication Data

US 2021/0261346 A1    Aug. 26, 2021

Related U.S. Application Data

(62) Division of application No. 16/618,860, filed as application No. PCT/US2018/036243 on Jun. 6, 2018, now Pat. No. 11,040,835.

(60) Provisional application No. 62/516,759, filed on Jun. 8, 2017.

(51) Int. Cl.
*B65G 23/04* (2006.01)
*F16H 55/17* (2006.01)
*B65G 39/09* (2006.01)

(52) U.S. Cl.
CPC ............. *B65G 23/04* (2013.01); *B65G 39/09* (2013.01); *F16H 55/17* (2013.01)

(58) Field of Classification Search
CPC ........ B65G 23/04; B65G 23/06; B65G 23/08; B65G 23/10; B65G 23/12; B65G 39/09; F16H 55/17

USPC ..................................... 193/37; 198/834–835
See application file for complete search history.

(56) References Cited

U.S. PATENT DOCUMENTS

| | | | |
|---|---|---|---|
| 3,061,386 A * | 10/1962 | Dix | F16D 1/0835 384/535 |
| 3,608,987 A | 9/1971 | Jordan | |
| 4,143,757 A | 3/1979 | Wallenfang | |
| 4,171,044 A | 10/1979 | Rossio | |
| 4,203,590 A | 5/1980 | Blessing | |
| 4,621,400 A | 11/1986 | van der Graaf | |
| 5,174,438 A | 12/1992 | Witham | |
| 5,383,549 A | 1/1995 | Mayer | |
| 5,524,740 A | 6/1996 | Conley | |
| 5,911,307 A | 6/1999 | Kraft et al. | |

(Continued)

FOREIGN PATENT DOCUMENTS

| | | |
|---|---|---|
| CN | 204355183 U | 5/2015 |
| CN | 205471209 U | 8/2016 |

(Continued)

OTHER PUBLICATIONS

Supplementary European Search Report, European U.S. Appl. No. 18/812,655, dated Feb. 8, 2021, European Patent Office, Munich, Germany.

(Continued)

*Primary Examiner* — Mark A Deuble
(74) *Attorney, Agent, or Firm* — Catherine M. Bishop

(57) ABSTRACT

A sealed sprocket for a conveyor belt comprises a sprocket mounted on a drive shaft and a seal system sealing an interface between the sprocket and the drive shaft. The seal system comprises a seal cap housing ring seals for sealing interfaces between the sprocket and seal cap and between the seal cap and drive shaft.

16 Claims, 9 Drawing Sheets

(56) References Cited

U.S. PATENT DOCUMENTS

| | | | |
|---|---|---|---|
| 6,124,656 A * | 9/2000 | Jensen | B65G 39/02 |
| | | | 310/409 |
| 6,142,290 A | 11/2000 | Tagliaferr | |
| 6,148,986 A * | 11/2000 | Brink | B65G 39/09 |
| | | | 193/37 |
| 6,367,613 B1 | 4/2002 | Montgomery | |
| 6,443,295 B1 * | 9/2002 | Hill | B65G 23/08 |
| | | | 198/788 |
| 7,407,051 B1 | 8/2008 | Farris et al. | |
| 7,913,835 B2 * | 3/2011 | Gautier | F16C 13/00 |
| | | | 198/780 |
| 8,146,733 B2 | 4/2012 | Fox | |
| 8,430,801 B2 * | 4/2013 | Dallum | B65G 39/12 |
| | | | 492/59 |
| 8,763,778 B2 | 7/2014 | Lemay | |
| 8,863,942 B2 | 10/2014 | Powell | |
| 8,967,371 B2 | 3/2015 | Dunn | |
| 10,088,053 B1 | 10/2018 | Hartney et al. | |
| 10,215,282 B1 | 2/2019 | Taylor et al. | |
| 10,392,197 B1 | 8/2019 | Roozeboom | |
| 10,640,296 B2 * | 5/2020 | Mans | B65G 23/08 |
| 11,040,835 B2 * | 6/2021 | DeGroot | B65G 23/04 |
| 2008/0078648 A1 * | 4/2008 | Orlowski | B65G 43/02 |
| | | | 193/37 |
| 2011/0222810 A1 * | 9/2011 | Lubezny | F16C 13/02 |
| | | | 384/549 |
| 2012/0213458 A1 | 8/2012 | Zuiko | |
| 2013/0186728 A1 * | 7/2013 | Spiess | B64D 9/00 |
| | | | 193/37 |
| 2014/0069767 A1 | 3/2014 | Arsenenau | |
| 2014/0326583 A1 | 11/2014 | Wolters et al. | |
| 2015/0360872 A1 | 12/2015 | Wolters et al. | |
| 2018/0257870 A1 | 9/2018 | Guerra et al. | |
| 2019/0233217 A1 | 8/2019 | Grimm et al. | |

FOREIGN PATENT DOCUMENTS

| | | | | |
|---|---|---|---|---|
| DE | 29623889 U | 6/2000 | | |
| EP | 0922809 A1 | 6/1999 | | |
| GB | 2065829 A * | 7/1981 | | B65G 39/09 |
| GB | 2065829 A | 7/1981 | | |
| JP | 06-080230 A | 3/1994 | | |
| JP | H10-77112 A | 3/1998 | | |
| JP | 2001-163430 A | 6/2001 | | |
| WO | 2008030470 A2 | 3/2008 | | |

OTHER PUBLICATIONS

First Office Action, Chinese Patent Application No. 201880033884.7, dated Apr. 4, 2021, China National Intellectual Property Administration.

Notice of Reasons for Refusal, Japanese Patent Application No. 2019-563066, dated Oct. 5, 2021, Japan Patent Office.

* cited by examiner

SEALED SPROCKET FOR A CONVEYOR SYSTEM

RELATED APPLICATIONS

This application is a divisional of U.S. patent application Ser. No. 16/618,860 filed Dec. 3, 2019 and entitled "Sealed Sprocket for a Conveyor System", which is a 371 of PCT/US18/036243, filed Jun. 6, 2018, which in turn claims priority to U.S. Provisional Patent Application No. 62/516,759, filed Jun. 8, 2017 and also entitled "Sealed Sprocket for a Conveyor System." The contents of all above-referenced applications are incorporated herein by reference.

BACKGROUND

The invention relates generally to sprockets for an endless conveyor belt system. More particularly, the invention relates to sealed sprockets for preventing dirt, bacteria and—or other contamination from entering a bore hole of a sprocket.

Sprockets are used to drive endless power-transmission and conveyor belts and chains. Each sprocket is mounted on a shaft received by a bore hole extending axially through the sprocket. A gearbox or a belt-driven pulley mounted to an end of the shaft makes the shaft a driveshaft. The interface between a sprocket and a shaft provides opportunity for dirt, debris and—or liquid to leak into the bore, compromising hygiene and providing a niche point for bacteria and a potential source of contamination.

SUMMARY

One version of a sprocket embodying features of the invention comprises a sprocket mounted on a drive shaft and a seal system sealing an interface between the sprocket and the drive shaft. The seal system comprises a seal cap housing ring seals for sealing interfaces between the sprocket and seal cap and between the seal cap and drive shaft.

According to one aspect, an assembly in a conveyor system, comprises a sprocket having peripheral teeth for engaging a conveyor belt and a central bore hole for receiving a shaft, a shaft inserted in the central bore hole and a sealing device for sealing the interface between the sprocket and shaft.

According to another aspect, a seal for a sprocket comprises an end seal cap configured to receive a shaft and interface with a sprocket end face, a first annular seal compressively seated in a groove for sealing an interface between the sprocket and the annular seal cap and a second annular seal compressively seated in a groove for sealing an interface between the annular seal cap and the shaft.

DETAILED DESCRIPTION

A sprocket or roller for driving or otherwise engaging a conveyor belt comprises a seal for preventing bacteria, dirt, liquid and—or other contamination from entering the bore hole of the sprocket. The invention will be described below relative to certain illustrative embodiments, though the invention is not limited to the illustrative embodiments.

Figure 1:
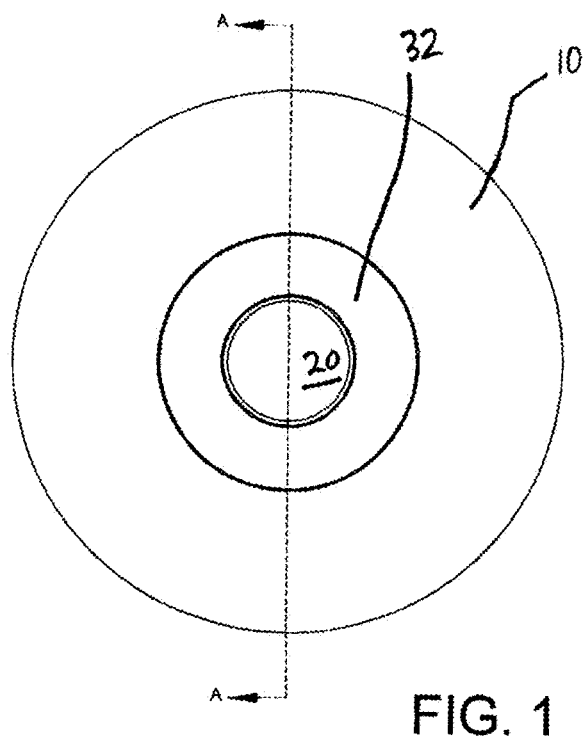
FIG. 1 is a side view of a sealed sprocket according to an embodiment of the invention.
Figure 2:
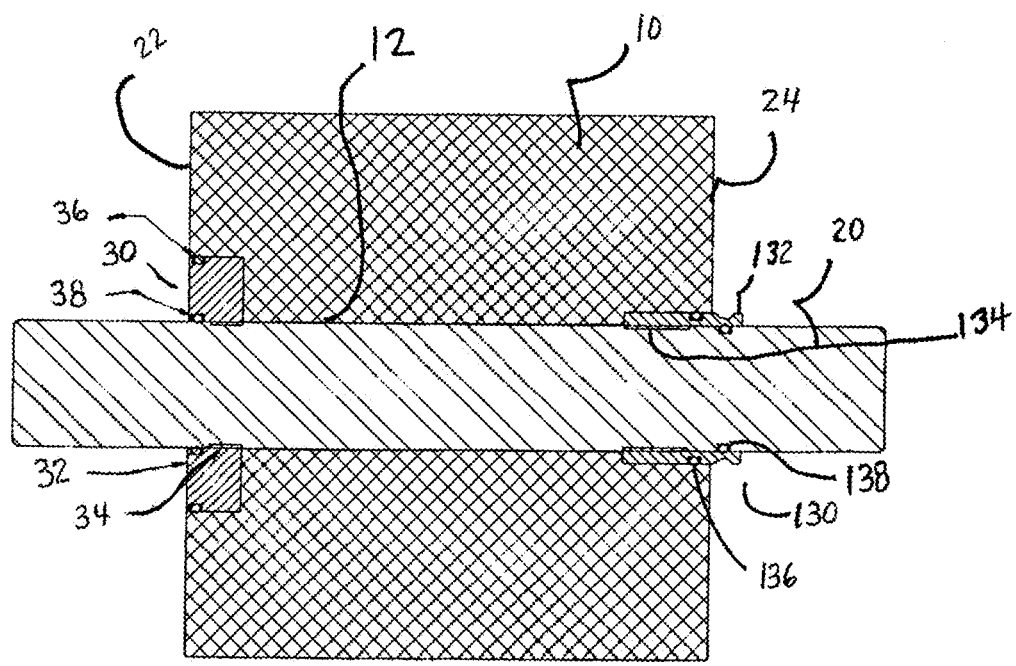
FIG. 2 is a cross-sectional view of the sprocket of FIG. 1 through line A-A.

FIGS. 1 and 2 show a sealed sprocket 10 according to an embodiment of the invention. The illustrative sprocket 10 is a full width sprocket, spanning the width of a corresponding conveyor belt, but the invention is not so limited. The sprocket comprises a cylindrical body having peripheral teeth (not shown) for engaging drive elements, such as drive teeth, on a conveyor belt, and a central bore hole 12 extending along the central axis. The cylindrical body may be formed of any suitable plastic or other material. The central bore hole 12 is designed to receive a drive shaft 20 for driving the sprocket 10. The drive shaft 20 may be knurled, though the invention is not so limited. A seal system 30 seals the interface between the sprocket and shaft at one or both ends of the bore hole 12.

The seal system 30 comprises an annular seal cap 32 formed of stainless steel, PEEK or another suitable material. The seal cap 32 is seated in an annular groove in a first end face 22 of the sprocket 20. The illustrative seal cap 32 is flush with the end face 22, though the invention is not so limited. The seal system 30 further comprises a tolerance ring 34 between the shaft and the seal cap, spaced from the first end face 22. The tolerance ring 34 is seated in a groove on either the outer surface of the shaft (as shown) or a groove formed in an inner surface of the seal cap 32.

The seal system 30 further includes seal rings, shown as a radially inner o-ring 38 and a radially outer o-ring 36. The seal rings are not limited to O-rings, and can alternatively comprise gaskets, lip seals, adhesives or any other suitable type of seal. The radially inner o-ring 38 is compressively seated in a groove in an inner surface of the seal cap 32 and seals an interface between the seal cap 32 and shaft 20. The radially outer o-ring 36 is compressively seated in a groove in an outer surface of the seal cap 32 to seal between the sprocket 10 and the seal cap 32. Alternatively, the radially outer o-ring 36 may be seated in a groove in the sprocket, and-or the radially inner o-ring 38 may be seated in a groove in the radially outer surface of the shaft 20.

FIG. 2 also shows another embodiment of a seal system 130 formed at a second end face 24 of the sprocket for sealing between the shaft 20 and sprocket 10. The seal system 130 includes a seal cap, shown as a seal sleeve 132, overlaying the shaft at an interface between the shaft 10 and sprocket 20 and extending into and from the second end face 24 of the sprocket. The radially inner surface of the sprocket includes a groove for seating the seal sleeve 132, which may be formed of stainless steel, PEEK or another suitable material. A tolerance ring 134 is seated in a groove on either the outer surface of the shaft (as shown) or a groove formed in an inner surface of the seal cap 132, at an end of the seal sleeve that is distal from the second end face 24. The seal sleeve 132 is configured to seat two seal rings, shown as o-rings 136, 138. The first o-ring 136 is compressively seated in a groove in the radially outer surface of the seal sleeve 132 and is axially inwards in the second end face 24 (within the body of the sprocket 20). The second o-ring is 138 compressively seated in either a groove on the outer surface of the shaft or the inner surface of the seal sleeve to seal between the seal sleeve and shaft, though the invention is not so limited.

Figure 3:
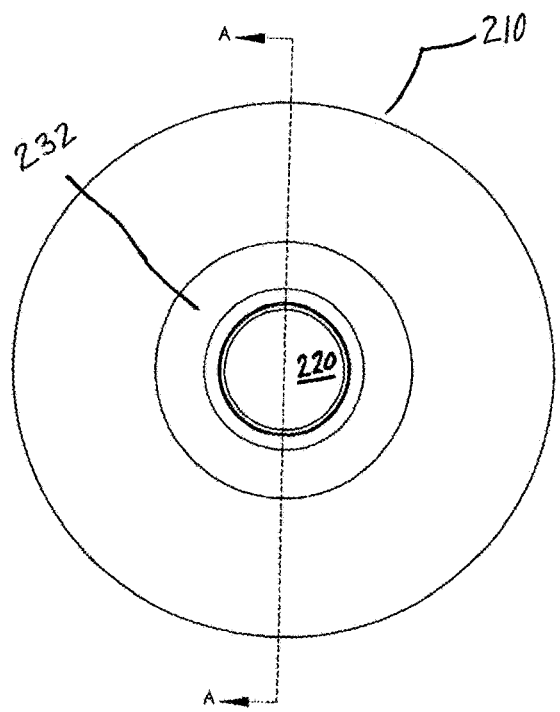
FIG. 3 is a side view of a sealed sprocket according to another embodiment of the invention.
Figure 4:
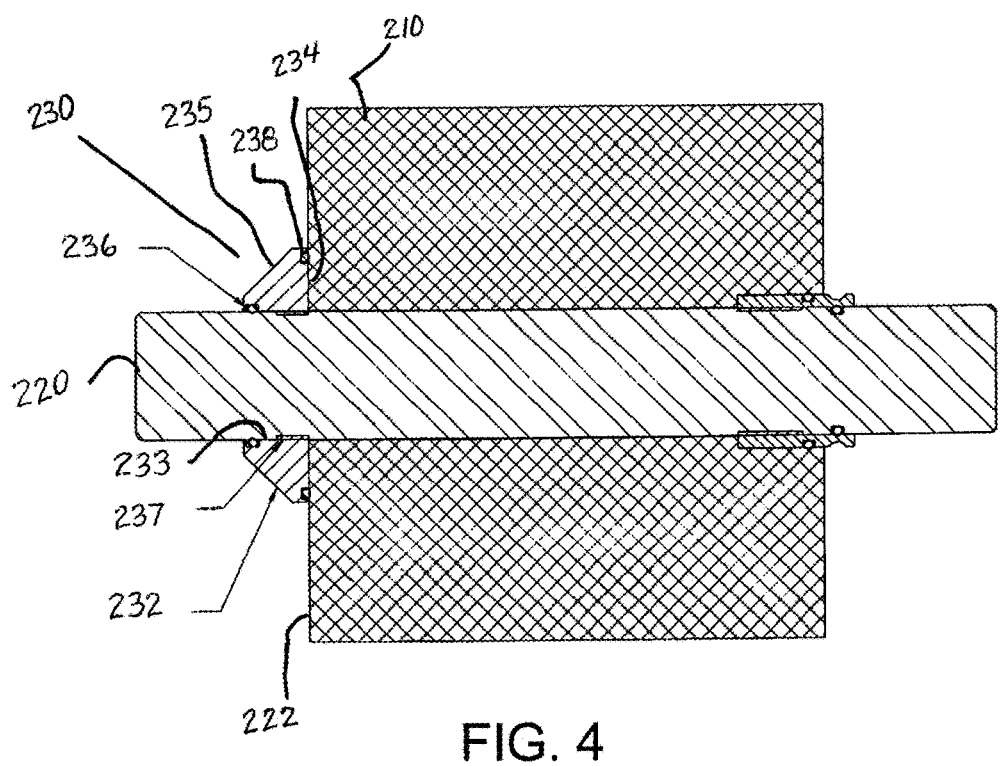
FIG. 4 is a cross-sectional view of the sprocket of FIG. 3 through line A-A.

FIGS. 3 and 4 show another embodiment of a sealed sprocket 210 including a seal system 230 for providing a hygienic interface between a shaft 220 and the sprocket body. The seal system 230 comprises an external seal cap 232 adjacent a first end face 222 of the sprocket. The external seal cap 232 comprises an annular element having an axially inner face 234 designed to seat a first o-ring 238, or other suitable seal ring, and a radially inner face 233 designed to seat a second o-ring 236, or other suitable seal ring. The first o-ring 238 seals an interface between the first end face 222 and seal cap 232 and the second o-ring seals an interface between the end cap and shaft 220. The o-rings can be seated in grooves formed in either the seal cap or the end face 222 or the shaft 220. The illustrative external seal cap 232 has an angled front face 235, but the invention is not so limited. The seat system 230 also includes a tolerance ring 237 between the radially inner surface of the seal cap and the shaft, which can be seated in a groove in either the shaft or seal cap 232.

Figure 5:
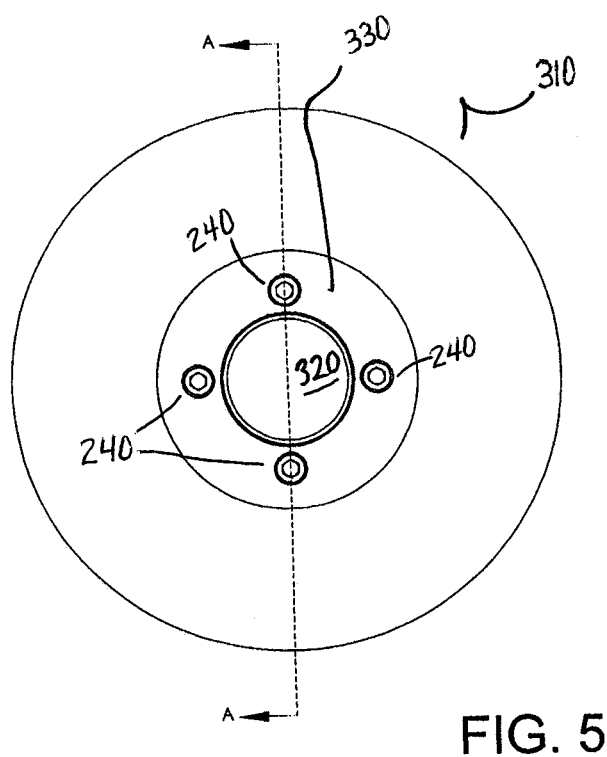
FIG. 5 is a side view of a sealed sprocket according to another embodiment of the invention.
Figure 6:
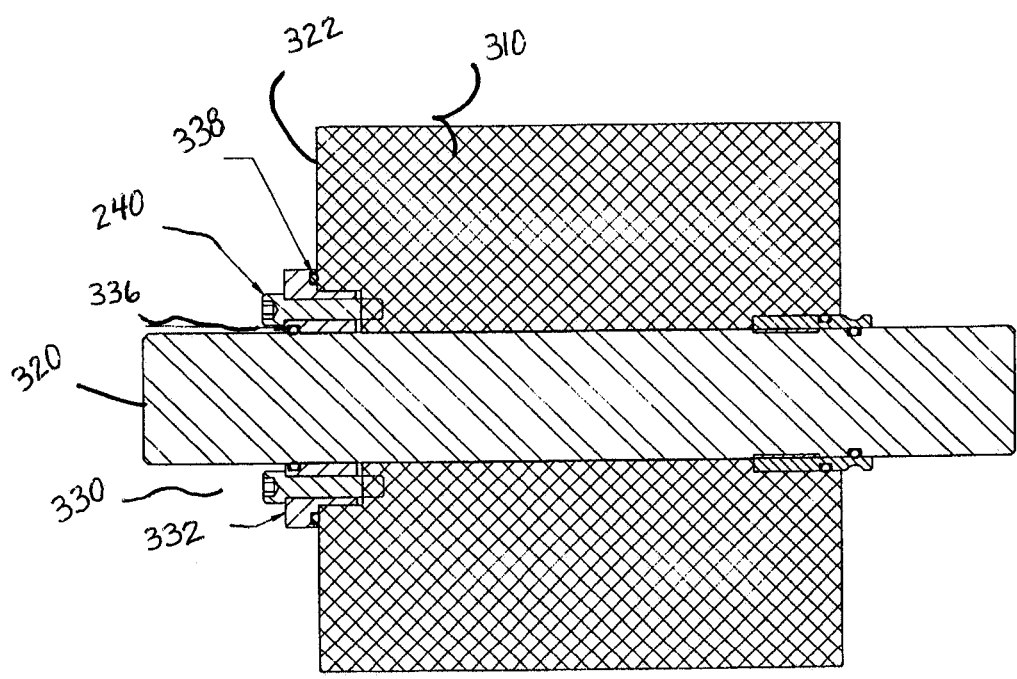
FIG. 6 is a cross-sectional view of the sprocket of FIG. 5 through line A-A.

FIGS. 5 and 6 show another embodiment of a sealed sprocket 310 including a seal system 330 for providing a hygienic interface between a shaft 320 and the sprocket body. The seal system 330 comprises an annular seal cap 332 extending from and into the first end face 322 of the sprocket. Fasteners 240, illustrated as bolts, extend axially through the seal cap 332 and into the end face 322 to secure the seal cap 332 to the sprocket. A first o-ring 338 seals an interface between the first end face 322 of the sprocket and seal cap 332 and a second o-ring 336 seals an interface between the end cap 332 and shaft 320. Other suitable types of seal rings can be used in place of o-rings.

A seal cap in a seal system for a sprocket can alternatively be inserted with a slight press fit without fasteners or tolerance rings.

Figure 7:
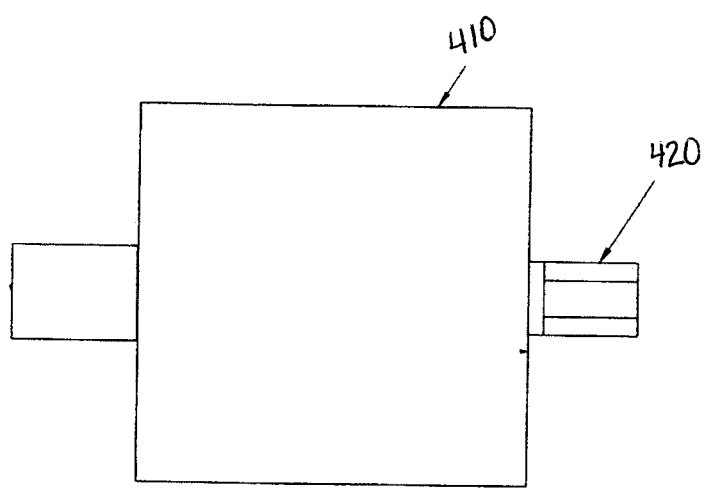
FIG. 7 is a front view of a sealed sprocket according to another embodiment of the invention
Figure 8:
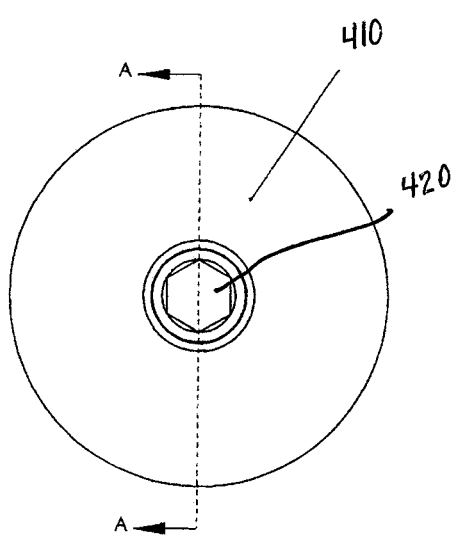
FIG. 8 is a side view of the sprocket of FIG. 7.
Figure 9:
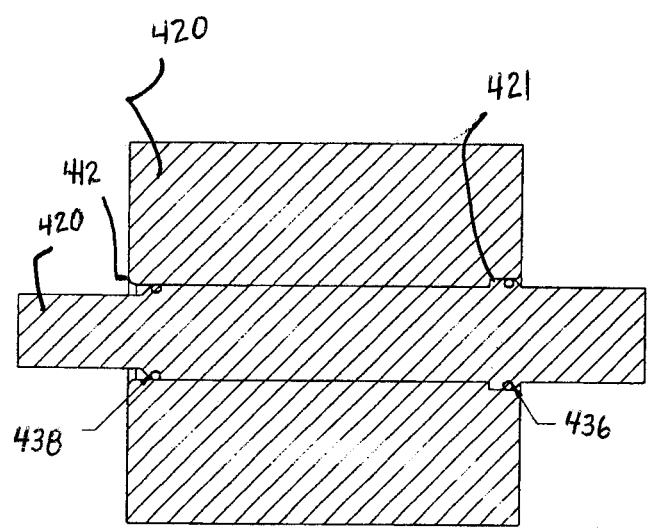
FIG. 9 is a cross-sectional view of the sprocket of FIG. 8 through line A-A.

FIGS. 7-9 show another embodiment of a sealed sprocket 410 including an internal seal system for sealing the interface between the sprocket body and shaft 420, which may be knurled. In the embodiment of FIGS. 7-9, the shaft 420 includes a first peripheral groove for seating a first o-ring 438, sealing an interface between a radially inner surface of the sprocket 410 and the shaft at a first end of the sprocket. The shaft 420 may have a reduced size at the first end. The bore hole 412 at the first end of the sprocket may be chamfered. The shaft 420 includes a step 421 at a second end in which is formed another peripheral groove for seating a second o-ring 436, and the sprocket bore is widened in this end to accommodate the step 421. The step 421 prevents damage to the o-ring 436 during insertion of the shaft into the sprocket. The second end of the bore hole 412 is enlarged to accommodate the step 421, and may also be chamfered.

Figure 10:
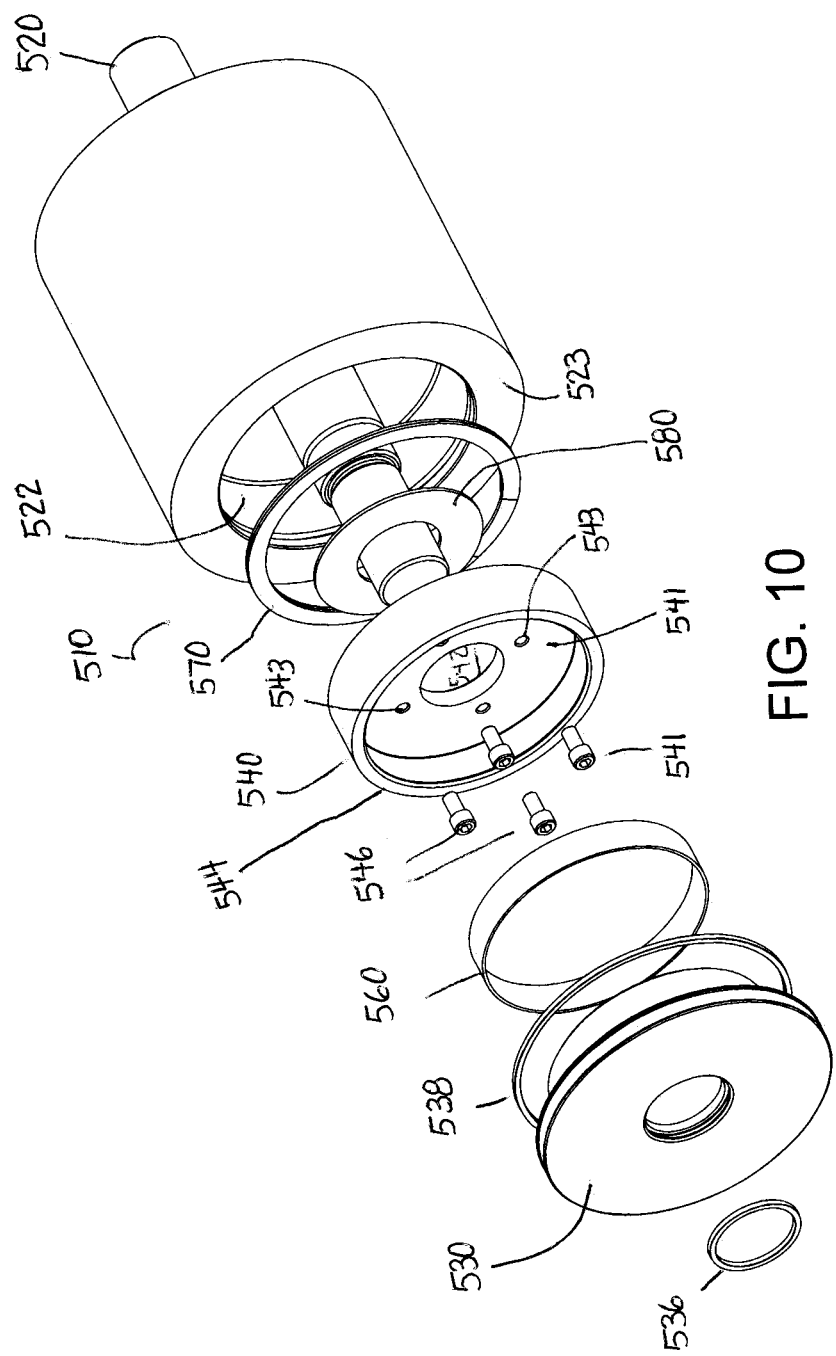
FIG. 10 is an exploded view of a sealed sprocket according to another embodiment of the invention.
Figure 11:
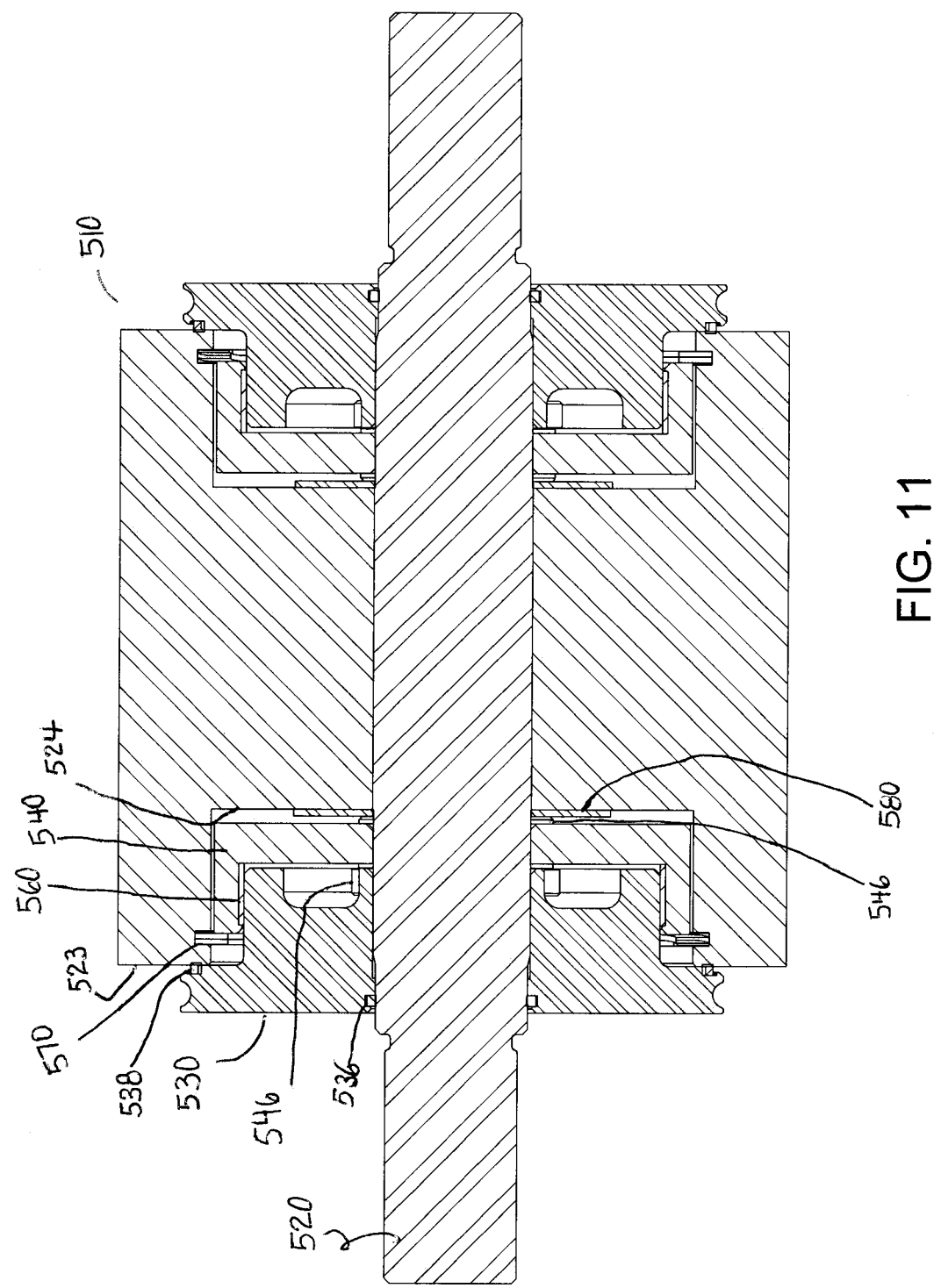
FIG. 11 is a cross-sectional view of the sealed sprocket of FIG. 10 when assembled.

FIGS. 10 and 11 show another embodiment of a sealed sprocket 510 including a seal system for sealing the interface between the sprocket body and shaft 520, which may be knurled. The end faces 523 of the sprocket body includes recesses 522 forming a cavity for receiving the seal system. The seal system includes an end seal cap 530 that includes a flanged portion that is larger than the recess 522 in the end face 523 of the sprocket 510 and an annular portion that is received in the recess 522. An inner o-ring 536 seals the interface between the shaft 520 and the inner surface of the seal cap 330. An outer o-ring 538 seals the interface between the flange of the end seal cap 530 and the end face 523 of the sprocket body. A tolerance ring 560 holds the end seal cap 530 in place. An inner tolerance ring holder 540 is inserted and contained in the cavity 522 for positioning the tolerance ring 560. The inner tolerance ring holder 540 comprises a flat, annular back wall 541 having a central opening 542 for receiving the shaft 520 and a plurality of fastener openings 543 surrounding the central opening 542. An annular lip 544 extends from the peripheral edges of the back wall 541 forming a seat for the end seal cap. When assembled, the tolerance ring 560 is sandwiched between the inner surface of the annular lip 544 and the outer surface of the annular portion of the end seal cap 530.

A clip ring 570 positions and retains the tolerance ring holder 540 within the cavity 522. A tensioner pretensions the tolerance ring holder against the clip ring 570 to ensure proper placement of the tolerance ring 560. In the illustrative embodiment, the tensioner comprises fasteners, shown as bolts 546, extending through the openings 543 in the holder to a shim 580, shown as a metal ring. The shim 580 is sandwiched between the bottom wall 524 of the cavity 522 and the back surface of the holder back wall 541. Any suitable means for positioning the tolerance ring holder 540 tightly against the clip ring 570 may be used. The tolerance ring 560, once properly positioned and inserted, holds the tolerance ring holder 540 and end seal cap 530 in sealed position.

In one embodiment, the inner cavity 522 in the sprocket end face may be filled with dye or another substance to detect failure of the o-rings 536, 538 or another malfunction.

Figure 12:
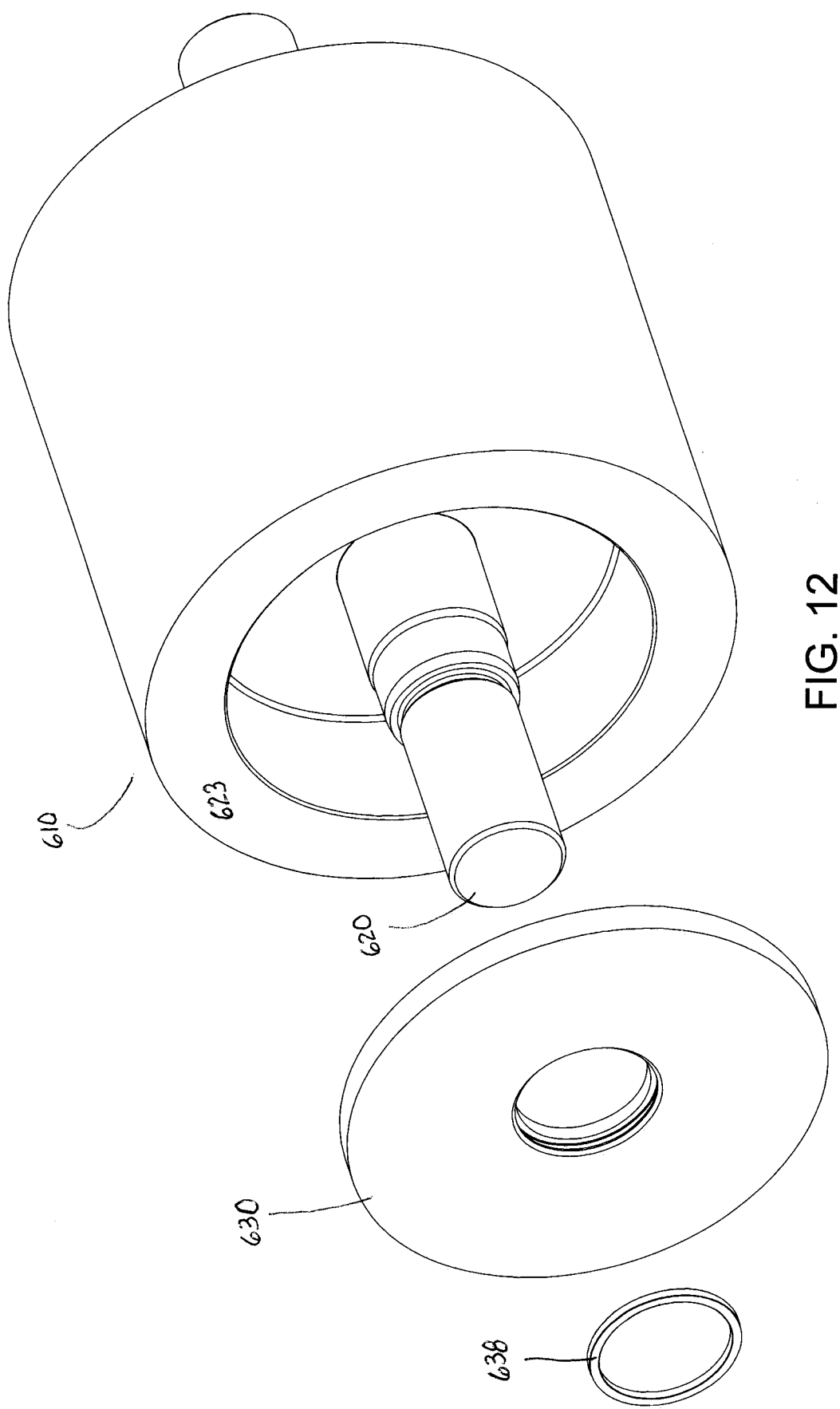
FIG. 12 is an exploded view of a sealed sprocket according to another embodiment of the invention.
Figure 13:
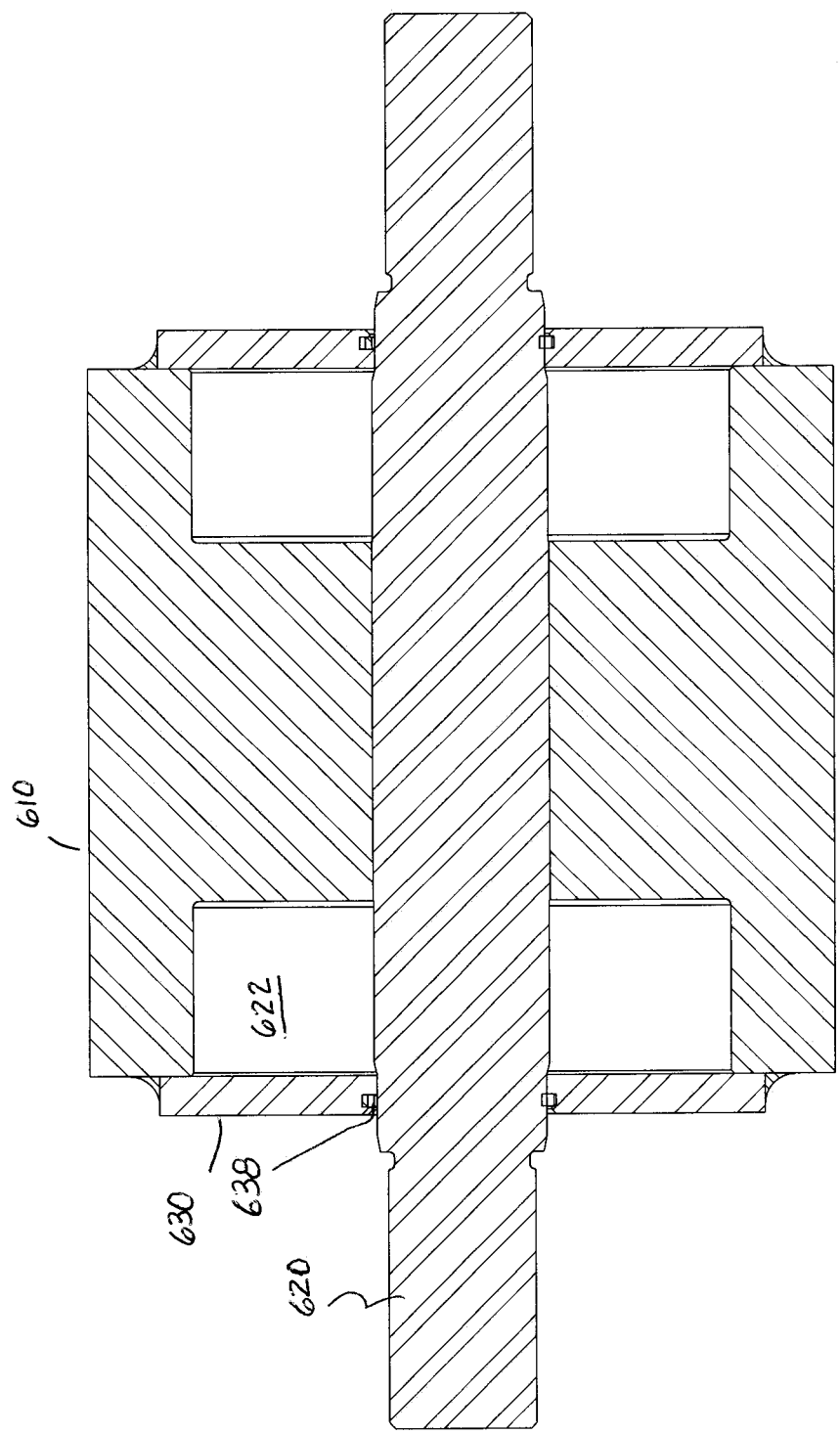
FIG. 13 is a cross-sectional view of the sealed sprocket of FIG. 12 when assembled.

FIGS. 12 and 13 show another embodiment of a sealed sprocket 610. The sealed sprocket includes a seal system comprising a flat annular end cap 630 having a central opening 631 for receiving a portion of the shaft 620 and a groove 632 extending around the inner surface of the central opening for receiving an o-ring 638 to seal the end cap against the shaft 630. The flat annular end cap is larger than the opening 622 in the end face of the sprocket. The flat annular end cap 630 can be sealed against the sprocket face 623 by welding or another suitable means.

In one embodiment, the inner cavity 622 in the sprocket end face may be filled with dye or another substance to detect failure of the o-ring 638 or weld, or another malfunction.

The seal systems described above prevent contamination from migrating into the interior of a sprocket.

Although the invention has been described in reference to a version of a sprocket, other versions are possible. For example, the seal system can be used with any roller, idler sprocket or component in a conveying system.

What is claimed is:

1. A seal for a sprocket, comprising:
   an annular seal cap comprising a flanged portion configured to interface with a sprocket end face and a smaller annular portion configured to be received in a recess in the sprocket end face and receive a shaft;

a first annular seal compressively seated in a first groove formed on an axially inner face of the flanged portion for sealing an interface between the sprocket and the annular seal cap; and a second annular seal compressively seated in a second groove formed on an inner surface of the annular portion for sealing an interface between the annular seal cap and the shaft.

2. The seal of claim 1, further comprising a tolerance ring between the shaft and the annular seal cap.

3. The seal of claim 2, wherein the tolerance ring is seated in a third groove.

4. The seal of claim 1, wherein the annular seal cap is formed of stainless steel.

5. The seal of claim 1, wherein the annular seal cap is formed of PEEK.

6. The seal of claim 1, further comprising:

a tolerance ring holder seated in a cavity in the sprocket end face, wherein a portion of the annular seal cap is seated in an opening in the tolerance ring holder, and a tolerance ring sandwiched between the tolerance ring holder and the annular seal cap.

7. The seal of claim 1, further comprising fasteners extending axially through the annular seal cap for securing the seal cap to the sprocket.

8. The seal of claim 1, further comprising a clip ring for retaining the seal in a sealed position.

9. The seal of claim 1, wherein the first annular seal and the second annular seal comprise o-rings.

10. A seal for a sprocket, comprising:

an annular seal cap configured to receive a shaft and interface with a sprocket end face;

a first annular seal compressively seated in a first groove for sealing an interface between the sprocket and the annular seal cap;

a second annular seal compressively seated in a second groove for sealing an interface between the annular seal cap and the shaft;

a tolerance ring holder seated in a cavity in the sprocket end face, wherein a portion of the annular seal cap is seated in an opening in the tolerance ring holder; and a tolerance ring sandwiched between the tolerance ring holder and the annular seal cap.

11. The seal of claim 10, wherein the annular seal cap comprises a flanged portion and a smaller annular portion configured to be received in the cavity in the sprocket end face.

12. The seal of claim 11, wherein the first groove is formed on an axially inner face of the flanged portion.

13. The seal of claim 12, wherein the second groove is formed on an inner surface of the annular portion.

14. The seal of claim 10, further comprising fasteners extending axially through the annular seal cap for securing the seal cap to the sprocket.

15. The seal of claim 10, further comprising a clip ring for retaining the seal in a sealed position.

16. The seal of claim 10, wherein the first annular seal and the second annular seal comprise o-rings.

\* \* \* \* \*